United States Patent [19]

Mukaida et al.

[11] Patent Number: 5,991,793
[45] Date of Patent: Nov. 23, 1999

[54] RESOURCE ALLOCATION METHOD IN COMPUTER SYSTEM

[75] Inventors: Yasuhiro Mukaida; Tadashi Yamagishi, both of Yokohama, Japan

[73] Assignee: Hitachi, Ltd., Tokyo, Japan

[21] Appl. No.: 08/769,216

[22] Filed: Dec. 18, 1996

[30] Foreign Application Priority Data

Dec. 21, 1995 [JP] Japan ................................. 7-333032

[51] Int. Cl.⁶ ....................................................... G06F 9/00
[52] U.S. Cl. ............................................. 709/104; 709/105
[58] Field of Search ........................... 395/674; 709/100, 709/102, 104, 103

[56] References Cited

U.S. PATENT DOCUMENTS 4,847,754  7/1989  Obermarck .
5,003,464  3/1991  Ely .
5,016,166  5/1991  Van Loo .

*Primary Examiner*—Majid A. Banankhah
*Attorney, Agent, or Firm*—Antonelli, Terry, Stout & Kraus, LLP

[57] ABSTRACT

The "sunk" or "hungered" state of a process group generated at the time of resource allocation in a computer system is prevented. A corresponding relationship between processes and process groups is stored in a group managing section. Requests from processes and process groups for the allocation of a resource are stored in an exclusive control managing section together with the receiving sequence of resource allocation requests, the type of each resource allocation request and the condition of allocation of the resource. On the basis of information stored in the group managing section and the exclusive control managing section, the allocation of the resource in units of one process group and in units of one process with regard to processes belonging to the same process group is made by a process execution managing section successively in accordance with the receiving sequence.

10 Claims, 8 Drawing Sheets

FIG. 3

| | | |
|---|---|---|
| POINTER TO IMMEDIATELY NEXT GROUP REQUEST TABLE | GTNEXT | 61 |
| GROUP ID | GTGID | 62 |
| ALLOCATION REQUEST TYPE (SHR / EXC) | GTTYPE | 63 |
| RESOURCE ALLOCATION CONDITION (HOLD / WAIT) | GTALLOC | 64 |
| POINTER TO LEAD OF PROCESS REQUEST TABLE LIST | GTPT | 65 |

| | | |
|---|---|---|
| POINTER TO IMMEDIATELY NEXT PROCESS REQUEST TABLE | PTNEXT | 71 |
| PROCESS ID | PTPID | 72 |
| RESOURCE ALLOCATION REQUEST TYPE (SHR / EXC) | PTTYPE | 73 |
| RESOURCE ALLOCATION CONDITION (HOLD / WAIT) | PTALLOC | 74 |

| PROCESS ID  GRPPID | GROUP ID  GRPGID |
|---|---|
| A | 1 |
| B | 1 |
| C | 1 |
| D | 2 |
| E | 2 |
| F | 2 |
| H | L |
| I | L |
| J | L |

41   42

RESOURCE ALLOCATION METHOD IN COMPUTER SYSTEM

BACKGROUND OF THE INVENTION

The present invention relates to a resource allocation method in computer system, and more particularly to such a method in which resources are allocated in units of one process or one process group.

In a computer system in which a plurality of processes are executed in parallel, it is required that a resource such as a file allocated to a certain process should not be allocated to another process until the certain process completes a lump of logical processing. This kind of control technique for resource allocation to processes is generally called exclusive control.

With the advancement of hardware techniques, there is nowadays generally used a parallel processing in which a processing hitherto performed by one process is performed in a divided manner by a plurality of processes having a logical relationship therebetween (called as a process group). In this case, a need to control the allocation of resources in units of one process as usual while controlling it in units of one process group is caused in order to obtain a significant result which is logically consistent. Therefore, JP-A-6-161861 has disclosed a file processing control system in which the allocation of resources is controlled in units of one process group.

In the file processing control system disclosed by the JP-A-6-161861, a process managing section manages the correspondence of processes to process groups to which that the respective processes belong. When a process declares which of process groups that process belongs to, a relationship in correspondence between the process and the process group is registered into the process managing section. In the case where a resource requested by the process is not being used or is being used by a process which belongs to the same process group, that resource is allocated to the requesting process. On the other hand, in the case where that resource is being used by a process which belongs to another process group, the allocation of that resource to the requesting process is rejected.

The above-mentioned prior art has the following problems.

A first problem concerns the sequence of allocation of a resource to process groups. In the prior art, a resource is allocated to a process group which makes a request for the allocation of the resource first after the release of the resource. Accordingly, there is generated a situation in which a resource is allocated to not an earlier requesting process group which made a request for the allocation of a resource before the release of the resource but to a later requesting process group which makes a request for the allocation of the resource after the release of the resource.

A second problem concerns a wait for allocation of a resource for processes which belong to a process group. In the prior art, in the case where a resource is not allocated, a process repeats a request for the allocation of the resource until the resource is allocated. Therefore, the processing time of a CPU executing that process is wasted.

A third problem concerns the sequence of allocation of a resource to processes. In the prior art, processes belonging to the same process group have thereamong no relationship between the sequence of requests for allocation of a resource by the individual processes and the sequence of allocation of the resource to the individual processes. Accordingly, there is generated a situation similar to that in the first problem, that is, a situation called "sunk" state in which a great deal of time is taken for the allocation of a resource or a situation called "hungered" state in which a resource is not allocated almost permanently.

A fourth problem concerns the sharing of a resource among process groups. If only the reference to a resource is to be made by both a first process group and a second process group, it is possible to allocate the resource to the first and second process groups concurrently. In the prior art, however, a resource is always allocated to only one process group irrespective of the manner of use of a resource by process groups.

A fifth problem concerns the sharing of a resource among processes. If only the reference to a resource is to be made by both a first process and a second process, it is possible to allocate the resource to the first and second processes concurrently. In the prior art, however, the exclusive allocation of a resource to one process in the same process group is not taken into consideration. Therefore, if the same process group has a plurality of processes performing the writing for a resource, there may be the case where there is not obtained a significant result which is logically consistent.

SUMMARY OF THE INVENTION

An object of the present invention is to provide a resource allocation method in computer system which makes it possible to prevent the "sunk" state or "hungered" state of a process group.

Another object of the present invention is to provide a resource allocation method in computer system in which a process waiting for a resource does not make the wasteful use of the processing time of a CPU.

A further object of the present invention is to provide a resource allocation method in computer system which makes it possible to prevent the "sunk" state or "hungered" state of a process.

A still further object of the present invention is to provide a resource allocation method in computer system which makes it possible to allocate a resource to a plurality of process groups concurrently in accordance with situations.

A furthermore object of the present invention is to provide a resource allocation method in computer system which makes it possible to select the concurrent allocation of a resource to a plurality of processes or the limited or exclusive allocation of a resource to one process in accordance with situations.

According to an embodiment of the present invention, in response to a request which a process belonging to one of process groups makes for the allocation of a resource, the judgement is made as to whether or not the allocation of the resource to the requesting process group is possible. The judgement is made considering the situation of allocation of the resource to another process group. In the case where the result of judgement is negative, the sequence of requests from process groups for the allocation of the resource is stored. Thereafter, the resource is allocated to the process groups successively in accordance with the stored sequence. With this construction, it is possible to provide a resource allocation method in computer system which makes it possible to prevent the "sunk" state or hungered state of a process group.

According to an embodiment of the present invention, in the case where the result of the above judgement is negative or in the case where the allocation of the resource to the resource allocation requesting process is impossible as the result of consideration of the situation of allocation of the resource to another process belonging to the same process group, the resource allocation requesting process is turned into an execution waiting condition. When the allocation of the resource becomes possible, the process in the execution waiting condition is changed to an execution enabled condition. With this construction, it is possible to provide a resource allocation method in computer system in which a process waiting for a resource does not make the wasteful use of the processing time of a CPU.

According to an embodiment of the present invention, in response to a request by one of processes for the allocation of a resource, the judgement is made as to whether or not the allocation of the resource to the requesting process is possible. The judgement is made considering the situation of allocation of the resource to another process. In the case where the result of judgement is negative, the sequence of requests from processes for the allocation of the resource is stored. Thereafter, the resource is allocated to the processes successively in accordance with the stored sequence. With this construction, it is possible to provide a resource allocation method in computer system which makes it possible to prevent the "sunk" state or "hungered" state of a process.

According to an embodiment of the present invention, at the time of request for the allocation of a resource from each process group, the requesting process group is caused to designate whether the sharing of the resource with another process group is possible. Next, in response to a request which a process group makes for the allocation of the resource, the judgement is made as to whether or not the sharing of the resource is designated by both the requesting process group and a resource allocated process group. In the case where the result of judgement is affirmative, the resource is shared between the requesting process group and the other process group. On the other hand, in the case where the result of judgement is negative, the allocation of the resource to the requesting process group until the resource is released. With this construction, it is possible to provide a resource allocation method in computer system which makes it possible to allocate a resource to a plurality of process groups concurrently in accordance with situations.

According to an embodiment of the present invention, at the time of request for the allocation of a resource from each process, the requesting process is caused to designate whether or not the sharing of the resource with another process is possible. In response to a request which a process makes for the allocation of the resource, the judgement is made as to whether or not the sharing of the resource is designated by both the requesting process and a resource allocated process. In the case where the result of judgement is affirmative, the resource is shared between the requesting process and the other process. On the other hand, in the case where the result of judgement is negative, the requesting process is turned into an execution waiting condition. With this construction, it is possible to provide a resource allocation method in computer system which makes it possible to select the concurrent allocation of a resource to a plurality of processes or the limited allocation of a resource to one process in accordance with situations.

BRIEF DESCRIPTION OF THE DRAWINGS

FIG. 3 shows an example of a group request table;

FIG. 4 shows an example of a process request table;

FIG. 5 shows the state of management by a group managing section;

DESCRIPTION OF THE PREFERRED EMBODIMENT

Embodiment of the present invention will now be explained by use of the accompanying drawings.

Figure 1:
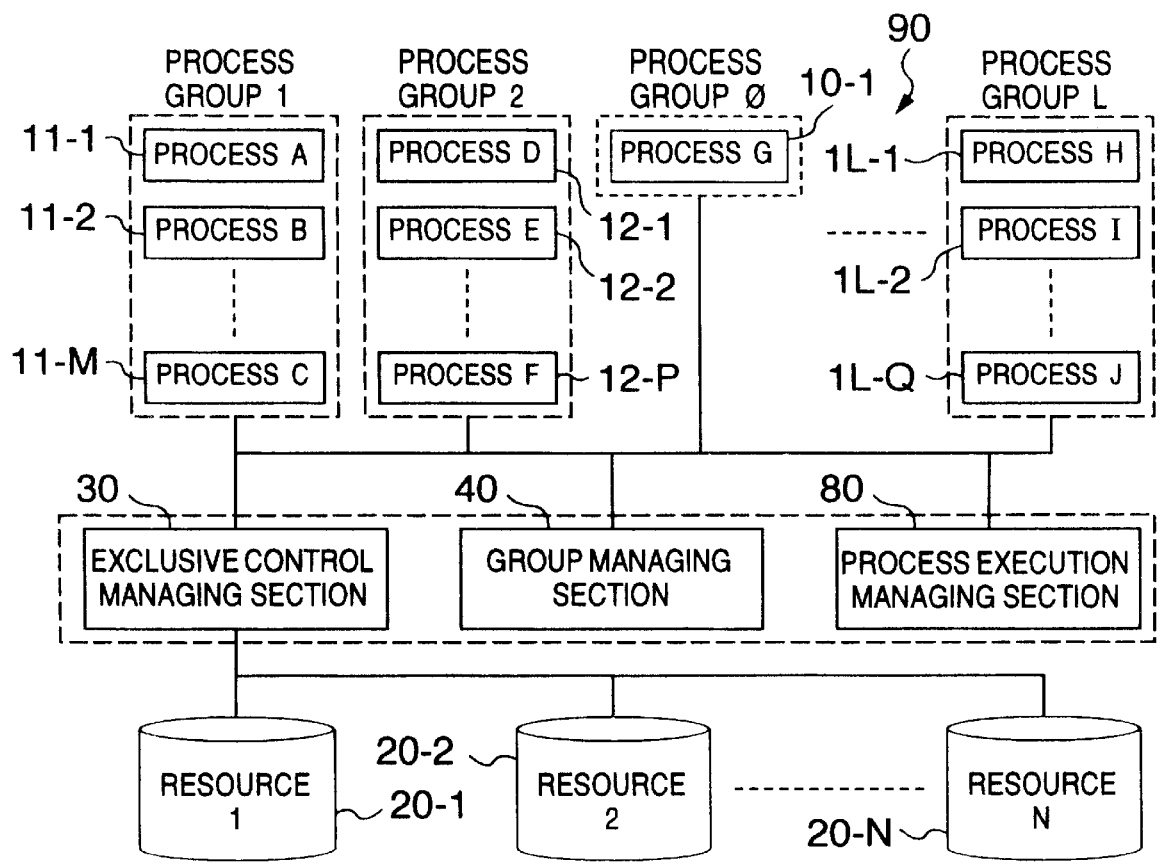
FIG. 1 is a schematic block diagram of an embodiment of the present invention.

FIG. 1 is a schematic block diagram of an embodiment of the present invention. Each of processes 11-1 to 1L-Q is the unit of processing performed by a computer system 90. The respective processes have their unique process identifiers (or process ID's) A to J. One or more processes form a process group. The respective process groups have their unique process group identifiers (or group ID's) 0, 1, 2, . . . , L. In the present embodiment, processes designating the same group ID by a group registration declaration forms one process group. For example, the processes A, B and C forms a process group 1. However, a process having no group registration declaration is regarded as making the declaration of formation of one process group by itself and the group ID of this process group is defined as 0. For example, the process G forms a process group 0 by itself. Processes each having a group ID of 0 are regarded as forming independent process groups, respectively. For example, if there are three processes which have no group registration declaration, three process groups 0 exist.

Resources 20-1 to 20-N are computer resources such as files, memories or the like required for executing the processes 11-1 to 1L-Q. Each resource can be allocated in units of one process group or in units of one process.

An exclusive control managing section 30 manages the sequence of resource allocation requests by processes or process groups, the type of each resource allocation request, the condition of resource allocation, and so forth. A group managing section 40 holds a corresponding relationship between processes and process groups. On the basis of information stored in the group managing section 40 and the exclusive control managing section 30, a process execution managing section 80 makes a control for exclusive allocation of resources in units of one process group and in units of one process with regard to processes which belong to same process group.

Figure 2:
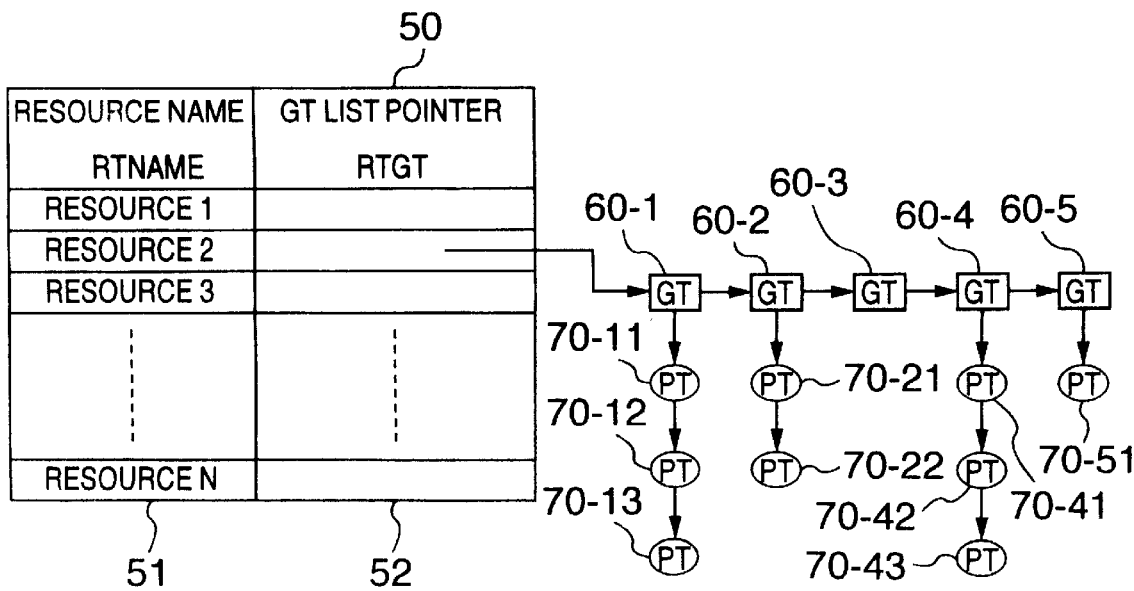
FIG. 2 shows the state of management by an exclusive control managing section.

FIG. 2 shows a managing structure of the exclusive control managing section 30. A resource managing table 50 has each entry corresponding to a resource allocated to a process group. Each entry is composed of a resource name (RTNAME) 51 of a resource allocated to a process group and a pointer (e.g., memory address) (RTGT) 52 to the list of group request tables (GT) 60 in a memory.

The group request tables (GT) 60-1 to 60-5 correspond to resource allocation requests from individual process groups. Each GT is generated for a resource allocation request from a process group. The sequence of listing of GT's 60-1 to 60-5 (hereinafter referred to as GT list) is the sequence of requests which process groups make for a resource (e.g. resource 2) corresponding to this list (or queue). The resource 2 is allocated in order from a process group corresponding to a leading GT 60-1 in the GT list, as will be mentioned later on.

Process request tables (PT) 70-11 to 70-51 represent requests from processes for the allocation of the resource 2 corresponding to the entry of the resource managing table 50 in which the PT's are queued. One PT corresponds to a resource allocation request from one process. The list of PT's is formed by resource allocation requests from processes which belong to the same process group. Further, the sequence of PT's in one PT list is the sequence of resource allocation requests from processes which belong to the same process group.

FIG. 3 shows the structure of the GT 60-1 as an example of the group request table. A pointer (GTNEXT) 61 to the immediately next GT represents a pointer to the next GT 60-2 and is used for forming a GT list. A group ID (GTGID) 62 is the group ID of a process group corresponding to the GT 60-1 under consideration (for example, group 1). An allocation request type (GTTYPE) 63 indicates the manner of allocation of the resource 2 to the corresponding process group. This is designated at the time of resource allocation request. When GTTYPE 63 is "SHR", it is indicated that the resource can be allocated concurrently to the corresponding process group and another process group designating "SHR" (or the resource can be shared therebetween). When GTTYPE 63 is "EXC", it is requested or indicated that irrespective of the allocation request type of another process group, the resource should not be allocated to the corresponding process group and the other process group concurrently (or the resource should be allocated exclusively).

A resource allocation condition (GTALLOC) 64 indicates the condition of allocation of the resource 2 to the process group corresponding to the GT 60-1. When GTALLOC 64 is "HOLD", it is indicated that the resource is already allocated to the corresponding process group. When GTALLOC 64 is "WAIT", it is indicated that the resource is not yet allocated to the corresponding process group. A pointer (GTPT) 65 to the lead of a process request table (PT) list is a pointer to a process request table (PT) 70-11 corresponding to that leading one in processes belonging to the process group under consideration which makes a request for the allocation of the resource 2 corresponding to this queue.

FIG. 4 shows the structure of the PT 70-11 as an example of the process request table. A pointer (PTNEXT) 71 to the immediately next process request table represents a pointer to the next PT 70-12 and is used for forming a PT list. A process ID (PTPID) 72 is the process ID of a process which makes a request for resource allocation. A resource allocation request type (PTTYPE) 73 indicates the manner of allocation of the resource 2 to the corresponding process. When PTTYPE 73 is "SHR", it is indicated that the resource can be allocated concurrently to the corresponding process and another process having the allocation request type of "SHR" (or the resource can be shared therebetween). When PTTYPE 73 is "EXC", it is requested or indicated that irrespective of the allocation request type of another process, the resource should not be allocated to the corresponding process and the other process concurrently (or the resource should be allocated exclusively).

A resource allocation condition (PTALLOC) 74 indicates the condition of allocation of the resource 2 to the corresponding process. When PTALLOC 74 is "HOLD", it is indicated that the resource is already allocated to the corresponding process. When PTALLOC 74 is "WAIT", it is indicated that the resource is not yet allocated to the corresponding process.

FIG. 5 shows the construction of the group managing section 40. The group managing section 40 manages a relationship between processes and process groups. One entry indicates the correspondence of a process to a process group to which this process belongs. A process ID (GRPPID) 41 stores the process ID of a process. A group ID (GRPGID) 42 stores the group ID of a process group to which a process indicated by GRPPID 41 belongs. As mentioned above, the group ID of a process making no group registration declaration is defined as 0. In the present embodiment, however, this process is not registered in the group managing section 40. In other words, the group ID of a process registered in no group managing section 40 is 0.

Though the allocation and release of a resource will be mentioned in detail later on, the outline thereof is as follows. Each process forming a process group makes a group registration declaration while designating the same group ID, thereby forming a process group. Next, one process in the process group makes a group resource request declaration to make a request for the allocation of a resource as the process group. Further, processes in the process group to use the resource successively make process resource request declarations to make requests for allocation of the resource to the respective processes.

In the case where it is not possible to instantly allocate a resource to a process, the process execution managing section 80 places the process into an execution waiting condition until there turns into a state in which the resource can be allocated to the process. When there turns into the state in which the resource can be allocated to the process, the process is placed into an execution enabled condition. If the process turns into an execution condition, the control returns to the process so that the process uses the resource. When the use of the resource is completed, a process resource release declaration is made to release the resource from the process. Further, when the use of the resource as a process group is completed, a group resource release declaration is made to release the resource from the group.

In the present embodiment, a process having no group registration declaration is regarded as forming one process group by itself. Therefore, when the process having no group registration declaration makes a process resource request declaration, a group resource request declaration is automatically made by the process execution managing section 80. When the process having no group registration declaration makes a process resource release declaration, a group resource release declaration is automatically made by the process execution managing section 80. Accordingly, a process having no group registration declaration is enabled to make a resource allocation request by only a process resource request declaration and to release a resource by only a process resource release declaration, as usual.

Figure 10:
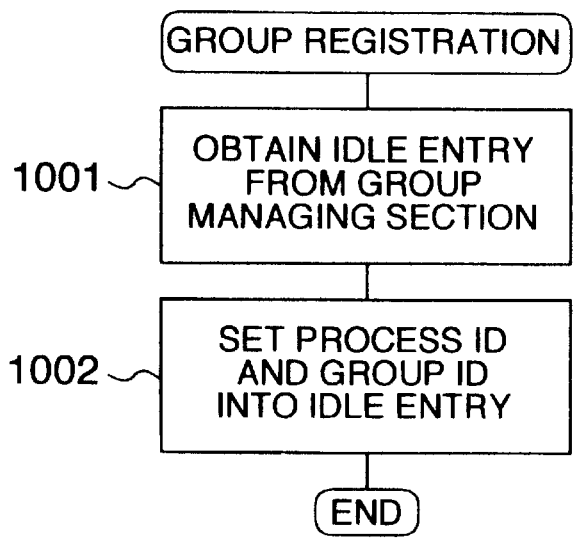
FIG. 10 is a flow chart showing a group registration declaration processing.

FIG. 10 shows the flow of a processing when a certain process makes a group registration declaration.

When the certain process makes a group registration declaration, an idle entry is obtained from the group managing section 40 (step 1001). The process ID of that process is set into GRPPID 41 of the obtained idle entry and the group ID of a process group designated by the declaration is set into GRPGID 42 (step 1002), thereby completing the processing.

Figure 6:
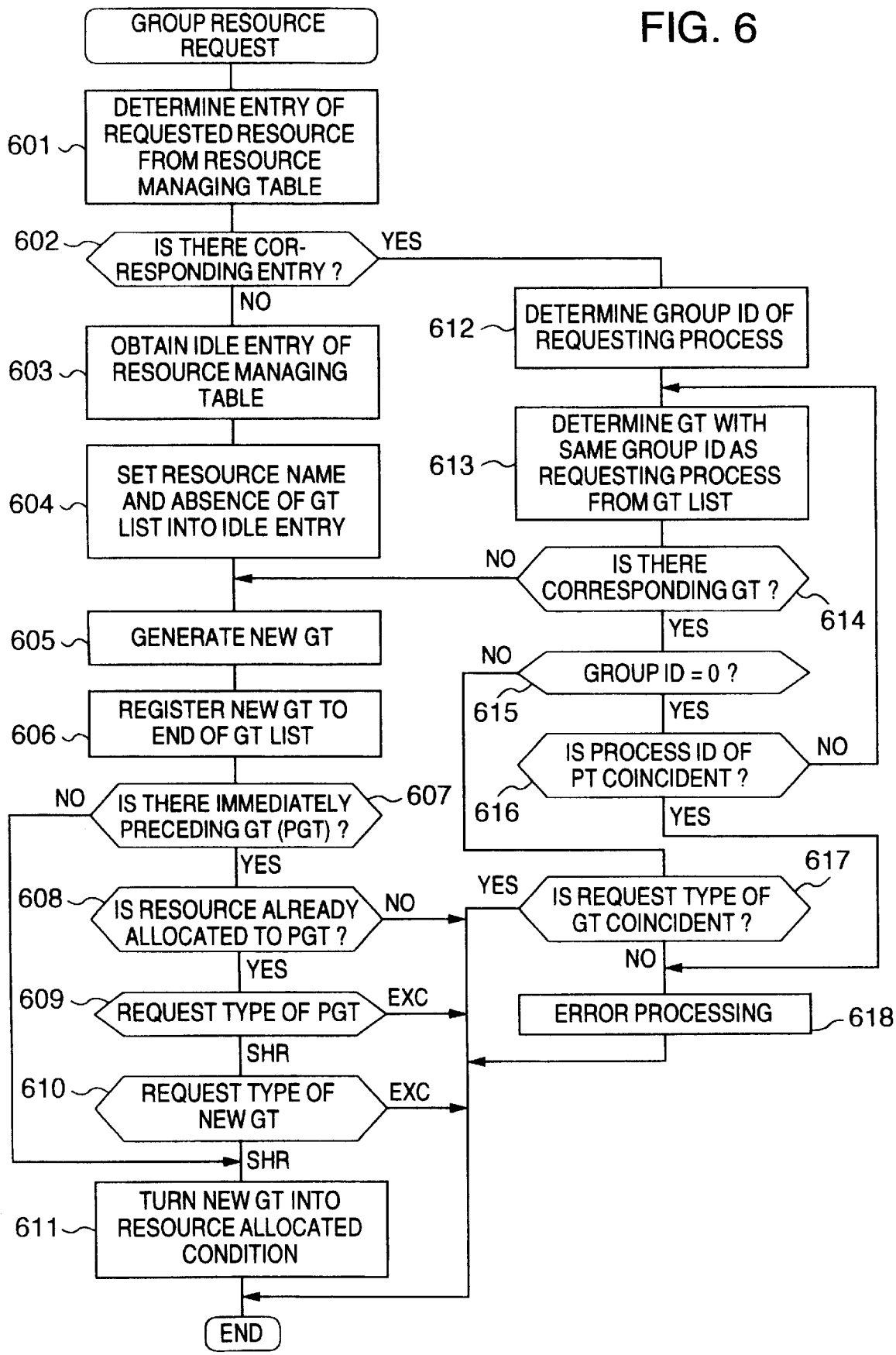
FIG. 6 is a flow chart showing a group resource request declaration processing.

FIG. 6 shows the flow of a processing when a certain process makes a group resource request declaration.

When a group resource request declaration is made, the reference is made to RTNAME 51 of each entry of the resource managing table 50 to examine whether or not an entry for managing a requested resource is present already in the resource managing table 50 (step 601). Next, the judgement is made as to whether or not there is the corresponding entry (step 602). The following processing is performed in accordance with the result of judgement.

(1) In Case Where There Is Entry

If there is the corresponding entry, the group ID of a requesting process is determined (step 612) and a GT having the same group ID as that of the requesting process is determined from the GT list (see FIG. 2) (step 613). Next, the judgement is made as to whether or not there is the corresponding GT (step 614). In the case where there is not the corresponding GT, the flow goes to step 605 which will be mentioned later on. In order to make a request for a resource as a process group, a GT is newly generated and the new GT is added to the end of the GT list.

On the other hand, in the case where there is the corresponding GT (that is, the GT of a process group to which the requesting process belongs), the judgement is made as to whether or not the group ID of the requesting process is 0 (that is, whether or not the requesting process forms one process group by itself) (step 615). When the group ID is 0, the judgement is made as to whether or not the determined GT is the GT of the requesting process (that is, a GT including a PT having a process ID which coincides with the process ID of the requesting process) (step 616). If the determined GT is the GT of the requesting process, an error processing is performed (step 618). If the determined GT is not the GT of the requesting process, the flow returns to step 613 to search for another GT of group 0.

When the group ID is not 0, the judgement is made as to whether or not the allocation request type of the determined GT coincides with a resource allocation request type designated by the requesting process (step 617). If both the request types coincide with each other, the processing is completed. If both the request types do not coincide, an error processing is performed regarding the allocation request as being contradictory (step 618).

(2) In Case Where There Is Not Entry

If there is not the corresponding entry (step 602), an idle entry is obtained from the resource managing table 50 (step 603) and the resource name of a resource requested by the declaration and an idle pointer indicating the absence of a list of DT's 60 are respectively set into RTNAME 51 and RTGT 52 of the obtained entry, thereby generating an entry which manages the requested resource (step 604).

Next or in step 605, a GT is newly generated so that the group ID of a process group making a request for the allocation of the resource and an allocation request type ("SHR" or "EXC") designated by the declaration are set into GTGID 62 and GTTYPE 63 of the new GT, respectively. Provided that the resource cannot be allocated instantly, "WAIT" is set into GTALLOC 64, as an immediate means. Further, provided that there is no resource allocation request from a process which belongs to the requesting process group, an idle pointer is set into GTPT 65. The newly generated GT is registered to the end of the GT list by use of GTNEXT 61 (step 606).

In steps 607 to 611, the examination is made of whether or not the allocation of the resource to the resource allocation requesting process group is possible. In the case where the allocation is possible, the resource is allocated to the requesting process group. The allocation of a resource is possible in (a) the case where there is no preceding resource allocation request or (b) the case where the resource is already allocated for a preceding resource allocation request, the allocation request type of the preceding resource allocation request is "SHR" and the allocation request type of the new resource allocation request is "SHR".

First, the examination is made of whether or not there is a preceding resource allocation request (step 607). If there is no preceding resource allocation request, the newly generated GT is a leading GT of the GT list and hence the flow branches to step 611 in order to allocate the resource to the new resource allocation requesting process group. If there is a preceding resource allocation request, the judgement is made as to whether or not the resource is already allocated for an immediately preceding resource allocation request (hereinafter referred to as PGT) (step 608). In the case where the resource is not yet allocated to PGT, the processing is completed. In the case where the resource is already allocated to PGT, the allocation request type of PGT is judged (step 609). If the type is "EXC", the processing is completed. On the other hand, if the type is "SHR", the allocation request type of the resource allocation request of the newly generated GT is judged (step 610). When the type is "EXC", the processing is completed. On the other hand, when the type is "SHR", GTALLOC 64 is changed to "HOLD" in order to turn the new resource allocation request into an allocated condition (step 611).

Figure 7:
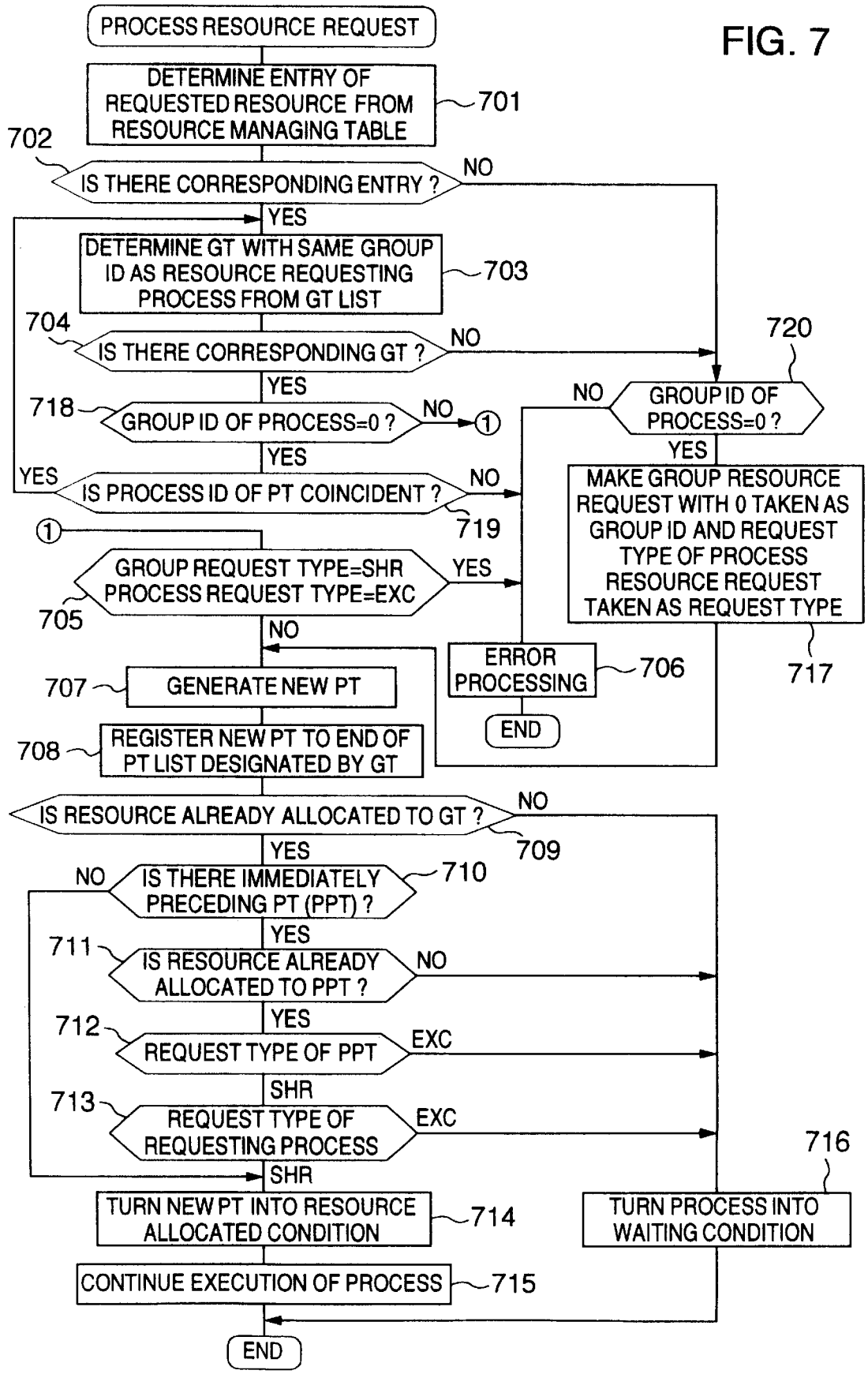
FIG. 7 is a flow chart showing a process resource request declaration processing.

FIG. 7 shows the flow of a processing when a certain process makes a process resource request declaration.

When the certain process makes a process resource request declaration, the reference is made to RTNAME 51 of each entry of the resource managing table 50 to determine an entry corresponding to a requested resource (step 701). And, the judgement is made as to whether or not there is the corresponding entry (step 702). The case where there is not the corresponding entry, it is indicated that only the process resource request declaration is made without making a group resource request declaration. In the present embodiment, the flow in that case goes to step 720 in order to automatically effect a group (or group 0) registration declaration.

On the other hand, in the case where there is the entry corresponding to the requested resource, a GT coinciding with the group ID of the requesting process is determined from a GT list by referring to GTGID 62 (step 703). And, the judgement is made as to whether or not there is the corresponding GT (step 704). In the case where there is not the corresponding GT, the judgement is made as to whether or not the group ID of the process is 0 (step 720). When the group ID is not 0, an error processing is performed (step 706). On the other hand, when the group ID is 0, a group resource request declaration processing is performed with 0 taken as a group ID and the request type of a process resource request taken as a resource allocation request type (step 717) and thereafter the flow goes to step 707.

On the other hand, if there is the corresponding GT, the judgement is made as to whether or not the group ID of the process is 0 (step 718). In the case where the group ID is not 0, the flow branches to step 705. In the case where the group ID is 0, the judgement is made as to whether or not the process ID of a PT related to the GT in question is coincident with the process ID of the process requesting the resource (step 719). If the coincidence is obtained, an error processing is performed (step 706). If the coincidence is not obtained, the flow returns to step 703 to determine another GT of group 0.

In step 705, the confirmation is made as to whether or not there is made a contradictory allocation request in which the resource allocation request type of process group is "SHR" while the resource allocation request type of the process resource request declaration is "EXC". If both the request types are contradictory to each other, an error processing such as error return or abnormal completion is performed (step 706), thereby completing the process resource request processing under consideration.

On the other hand, if both the request types are not contradictory to each other, a new PT is generated (step 707) and the generated PT is registered to the end of the PT list (step 708). Next, the reference is made to GTALLOC 64 to judge whether or not the resource is already allocated to a process group to which the corresponding process belongs (step 709). In the case where the resource is not yet allocated, the flow branches to step 716 to turn the process into a waiting condition until the allocation of the resource becomes possible.

On the other hand, in the case where the resource is already allocated, there is a possibility that the resource can be allocated to the resource allocation requesting process. Therefore, the judgement is made as to whether or not there is a resource allocation request by a preceding process (step 710). If there is not the request, the flow branches to step 714 in order to allocate the resource to the resource allocation requesting process. On the other hand, if there is a resource allocation request by a preceding process, the judgement is made as to whether or not the resource is already allocated to an immediately preceding resource allocation requesting process (step 711). In the case where the resource is not yet allocated, it is not possible to allocate the resource to the newly resource allocation requesting process and this process is therefore turned into a waiting condition until the allocation of the resource becomes possible (step 716).

On the other hand, in the case where the resource is already allocated, the request type of the immediately preceding resource allocation requesting process is judged (step 712). If the request type is "EXC", it is not possible to allocate the resource for the new resource allocation request and the newly resource allocation requesting process is therefore turned into a waiting condition until the allocation of the resource becomes possible (step 716). On the other hand, if the request type of the immediately preceding process is "SHR", the allocation request type of the newly resource allocation requesting process is judged (step 713). When the request type is "EXC", the flow goes to step 716. On the other hand, when the request type is "SHR", it is possible to allocate the resource for the new resource allocation request and "HOLD" is therefore set into PTALLOC 74 (step 714). Since the resource could thus be allocated to the newly resource allocation requesting process, it is possible to continue the processing. Therefore, the requesting process is set to an execution enabled condition so that the execution of the process is continued (step 715).

Figure 8:
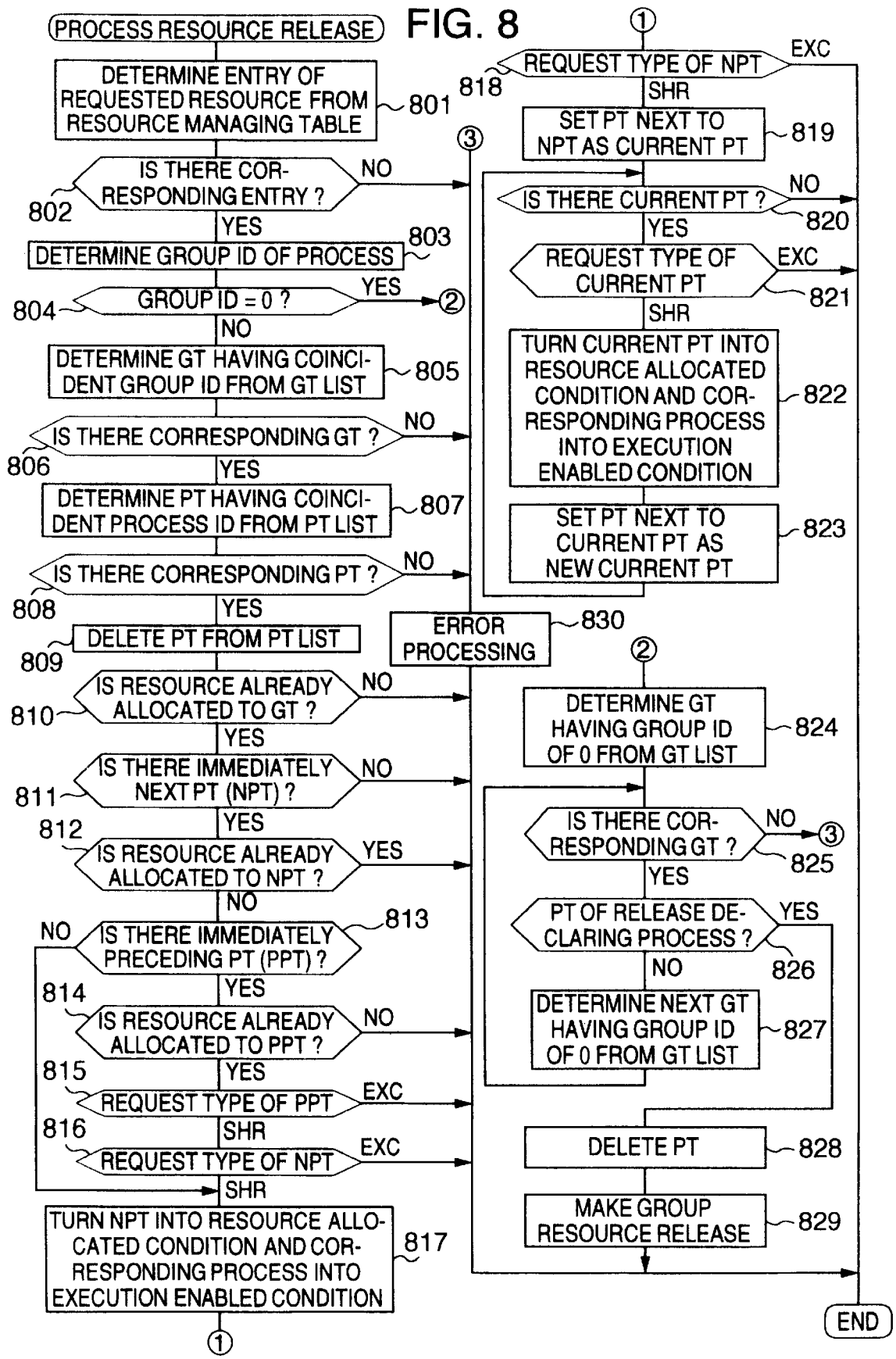
FIG. 8 is a flow chart showing a process resource release declaration processing.

FIG. 8 shows the flow of a processing when a process makes a process resource release declaration.

When a process makes a process resource release declaration, the reference is made to resource names in RTNAME 51 of the resource managing table 50 to determine an entry corresponding to a resource to be released (step 801). And, the judgement is made as to whether or not there is the corresponding entry (step 802). If there is not the corresponding entry, it is indicated that there is no resource to be released. In this case, therefore, an error processing is performed regarding the resource release request as being invalid (step 830).

In the present embodiment, in the case of a resource release request from a process which has no group registration declaration and forms one group by itself, a process resource release processing is performed while a group resource release processing is automatically performed. Therefore, in the case where there is the corresponding entry, the group ID of a process group of a resource release requesting process is determined (step 803) and the judgement is made as to whether or not the group ID is 0 (step 804). A procedure of determining this group ID will be mentioned later on by use of FIG. 11.

If the group ID is 0, it is indicated that the process is a process which makes no group registration declaration and forms one group by itself. Therefore, the flow branches to step 824 in order to perform a specified release processing. In step 824, a GT of the process resource release declaring process is determined. In the case where there is not the corresponding GT which satisfies the condition, that is, GT is not determined from the GT list (step 825), it is indicated that the process did not make a resource allocation request. In this case, therefore, an error processing is performed judging the resource release declaration as being invalid (step 830), thereby completing the process resource release processing under consideration. On the other hand, in the case where there is the corresponding GT which satisfies the condition, the judgement is made as to whether or not the GT is a GT having a PT of the release declaring process (step 826). If the result of judgement in step 826 is negative, the next GT having a group ID of 0 is determined from the GT list (step 827) and the flow then returns to step 825. On the other hand, if the result of judgement in step 826 is affirmative, the PT of the process resource release declaring process is deleted (step 828) and a group resource release declaration is automatically made to complete the processing (step 829). The group resource release declaration processing will be mentioned later on by use of FIG. 9.

If the group ID is not 0 (step 804), the reference is made to GTGID 62 to determine from the GT list a GT having a group ID coinciding with the group ID of a process group to which the release requesting or declaring process belongs (step 805). And, the judgement is made as to whether or not the determined GT is a corresponding GT which satisfies a condition (step 806). In the case where there is not the corresponding GT, it is indicated that the process group of the process resource release declaring process has not ensured the resource as a process group. In this case, therefore, an error processing is performed regarding the resource release declaration as being invalid (step 830).

On the other hand, in the case where there is the corresponding GT which satisfies the condition (step 806), the process ID of the process resource release declaring process is compared with PTPID 72 to determine the PT of the declaring process from a PT list designated by that GT (step 807). And, the judgement is made as to whether or not there is the corresponding PT (step 808). If there is not the corresponding PT, it is indicated that the process resource release declaring process did not make a resource allocation request. In this case, therefore, an error processing is performed regarding the resource release declaration as being unnecessary (step 830). On the other hand, if there is the corresponding PT, the PT of the process resource release declaring process is deleted (step 809).

In steps 810 to 823, there is performed a processing for allocation of the resource to a process which is enabled for resource allocation as the result of the process resource release declaration. However, if the resource is not yet allocated to the process group to which the process resource release declaring process belongs, the resource is never allocated to another process. Hereinafter, a PT immediately preceding the PT of the process resource release declaring process will be called PPT and a PT immediately next to the PT of the process resource release declaring process will be called NPT.

First, the judgement is made as to whether or not the resource is already allocated to the process group to which the process resource release declaring process belongs (step 810). In the case where the resource is not yet allocated, the resource is never allocated to another process and hence the processing is completed. In the case where the resource is already allocated, the judgement is made as to whether or not there is NPT (step 811). If there is not NPT, the processing is completed. On the other hand, if there is NPT, the judgement is made as to whether or not the resource is already allocated to NPT (step 812). In the case where the resource is already allocated to NPT, it is indicated that the resource is already allocated to the succeeding process. In this case, therefore, the processing is completed since it is not necessary to consider the allocation of the resource to the succeeding resource waiting process subsequent to the present resource release by the process resource release declaring process.

On the other hand, in the case where the resource is not yet allocated to NPT (that is, NPT is placed in a resource allocation waiting condition), the judgement is made as to whether or not there is PPT (step 813). In the case where there is not PPT, it is indicated that NPT takes the lead of the PT list hereinafter. In this case, therefore, the flow branches to step 817 to allocate the resource to a process corresponding to NPT.

In the case where there is PPT, it is possible to allocate the resource to NPT if the resource is already allocated to PPT, the allocation request type of PPT is "SHR" and the allocation request type of NPT is "SHR". Thus, if all of those conditions are satisfied in steps 814 to 816, PTALLOC 74 of NPT is changed to "HOLD" and the process corresponding to NPT is changed from an execution waiting condition to an execution enabled condition by use of the process execution managing section 80 (step 817). If either one of the above conditions in steps 814 to 816 is not satisfied, the processing is completed.

In steps 818 to 823, there is performed a processing in which if the allocation request type of NPT at the time of allocation of the resource to NPT is "SHR", the resource is to be allocated to processes corresponding to PT's with the allocation request type of "SHR" which continuously succeed to NPT.

First, the allocation request type of NPT is judged (step 818). In the case where the request type is "EXC", the processing is completed since it is not necessary to allocate the resource to a process indicated by a PT which succeeds to NPT. On the other hand, in the case where the request type is "SHR", a PT next to NPT is set as a current PT (step 819).

The judgement is made as to whether or not there is the current PT (step 820). If there is not the current PT, the processing is completed since the allocation of the resource is not necessary. If there is the current PT, the allocation request type of the current PT is judged (step 821). In the case where the request type is "EXC", the processing is completed since it is not necessary to allocate the resource to the current PT. On the other hand, in the case where the allocation request type of the current PT is "SHR", the resource is allocated to a process corresponding to the current PT and the condition of the process is changed from an execution waiting condition to an execution enabled condition (step 822). And, a PT next to the current PT is set as a new current PT (step 823). Then, the flow branches to step 820 again to have a try to allocation the resource to the continuously succeeding PT's. Namely, continuous PT's having the request type of "SHR" are all allocated with the resource.

Figure 9:
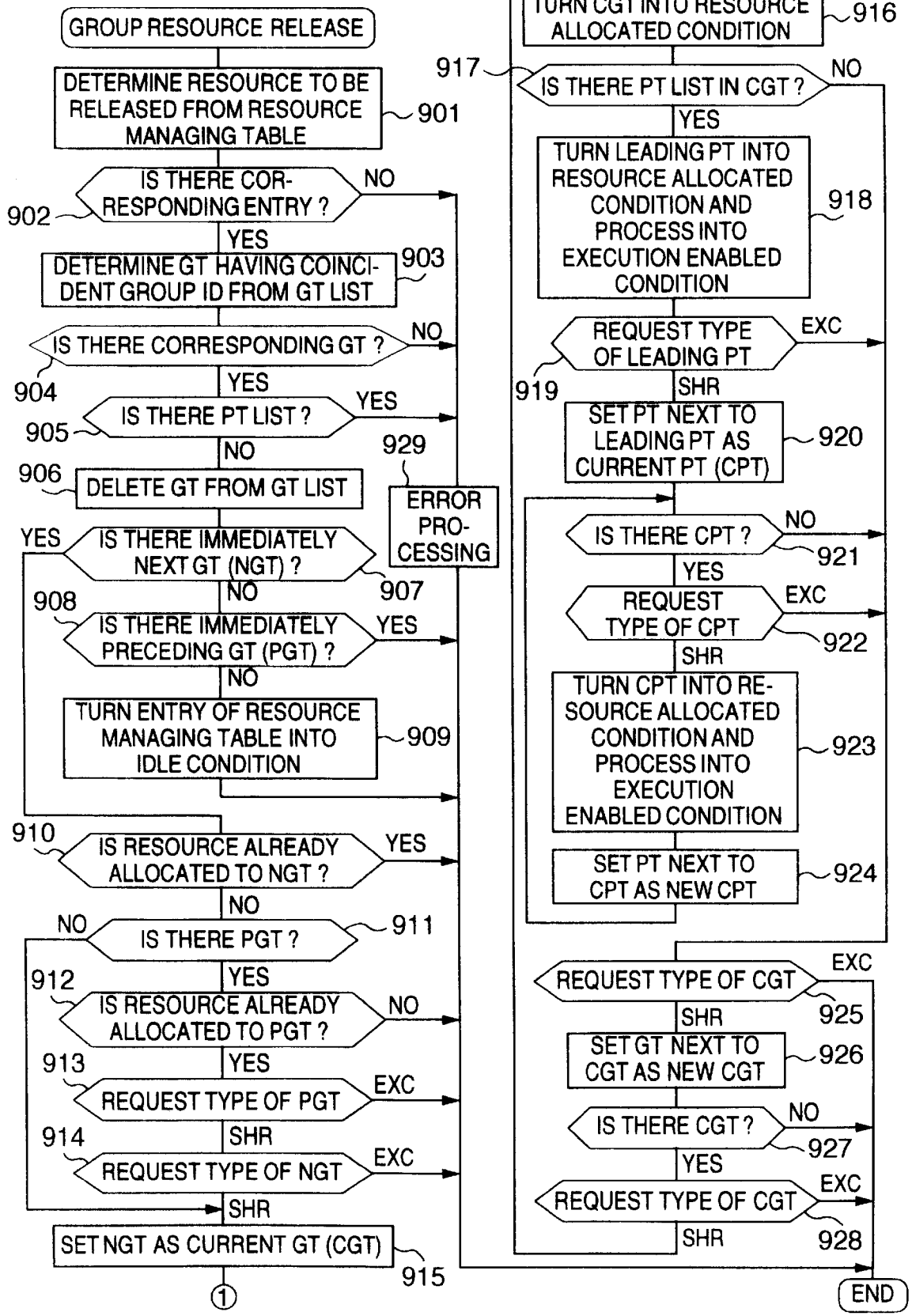
FIG. 9 is a flow chart showing a group resource release declaration processing.

FIG. 9 shows the flow of a processing when a process group makes a group resource release declaration.

When a certain process group makes a group resource release declaration, the reference is made to the resource managing table 50 to determine an entry corresponding to a resource to be released as the process group (step 901). In the case where there is not the corresponding entry (step 902), it is shown that the group resource release declaring process group did not make a request for allocation of the resource to be released. In this case, therefore, an error processing is performed (step 929), thereby completing the group resource release processing under consideration.

On the other hand, in the case where there is the corresponding entry (step 902), a GT corresponding to the group resource release declaring process group is determined from the GT list of the resource to be released (step 903). And, the judgement is made as to whether or not there is the corresponding GT (step 904). If there is not the corresponding GT, it is shown that the group resource release declaring process group did not make a request for the allocation of the resource to be released. In this case, therefore, an error processing is performed (step 929), thereby completing the group resource release processing under consideration.

On the other hand, in the case where there is the corresponding GT (step 904), the examination is made of whether or not the corresponding GT has a PT list (step 905). If the GT has the remaining PT list, it is indicated that the release of a resource being used by another process in the same process group is intended. Therefore, even if one PT remains, an error processing is performed regarding the resource release request as being invalid (step 929), thereby completing the group resource release processing under consideration. Namely, if the GT has no remaining PT list, that is, if the resource to be released is not being used by another process in the same process group, the GT corresponding to the process group is deleted from the GT list (step 906).

In steps 907 to 928, the release of the resource by the group resource release declaring process group is followed by a try to allocate the resource to a process group which makes a request for allocation of the resource later than the request by the group resource release declaring process group. Hereinafter, a process table corresponding to a process group immediately preceding the group resource release declaring process group will be called PGT and a process table corresponding to a process group immediately next to the process resource release declaring process will be called NGT.

First, the judgement is made as to whether or not there is NGT (step 907). If there is not NGT, the judgement is made as to whether or not there is PGT (step 908). In the case where there is not PGT, it is indicated that there is no process group which makes a request for allocation of the resource under consideration. In this case, therefore, the corresponding entry of the resource managing table 50 is turned into an idle condition to release the entry (step 909). In the case where there is not NGT but there is PGT, the processing is completed at step 908 since there is none to be done.

On the other hand, if there is NGT (step 907), the judgement is made as to whether or not the resource is already allocated to NGT (step 910). In the case where the resource is already allocated to NGT, the processing is completed since the allocation of the resource to the succeeding GT as the result of the present resource release is not caused. On the other hand, in the case where the resource is not yet allocated to NGT, there is a possibility that the resource can be allocated to a process group succeeding to NGT. In this case, therefore, the judgement is made as to whether or not there is PGT (step 911). When there is not PGT, NGT takes the lead of the GT list and hence the flow branches to step 915 in order to allocate the resource to NGT.

When there is PGT (step 911), the judgement is made as to whether or not the resource is already allocated to PGT (step 912). In the case where the resource is not yet allocated to PGT, the processing is completed since it is not possible to allocate the resource to NGT. On the other hand, in the case where the resource is already allocated to PGT, there is a possibility that the resource can be allocated to NGT. In this case, therefore, the resource allocation request type of PGT is judged (step 913). If the request type is "EXC", the processing is completed since the resource cannot be allocated to NGT. On the other hand, if the request type is "SHR", there is a possibility that the resource can be allocated to NGT. In this case, therefore, the resource allocation request type of NGT (step 914).

In the case where the request type of NGT is "EXC", the processing is completed since it is not possible to allocate the resource to NGT concurrently with PGT. On the other hand, in the case where the request type of NGT is "SHR", it is possible to allocate the resource to NGT concurrently with PGT and therefore NGT is set as a current GT to allocate the resource to NGT (step 915).

In steps 916 to 928, there is performed a processing in which if the resource allocation request type of the current GT (CGT) is "SHR" when the resource is allocated to CGT and a process which belongs to the process group of CGT, the resource is to be allocated to GT's with the allocation request type of "SHR" which continuously succeed to CGT and a process which belongs to the process group of each of such GT's.

First, CGT is turned into a resource allocated condition (step 916). Namely, "HOLD" is set into GTALLOC 64. IF a process belonging to the process group of CGT has made a resource allocation request, there is a PT list in CGT. Namely, the allocation of the resource as a process group is already made. Therefore, it is possible to allocate the resource to a process which belongs to that process group.

Thus, the judgement is made as to whether or not there is a PT list in CGT (step 917). In the case where there is not a PT list in CGT (that is, there is not a resource allocation request from a process which belongs to the process group of CGT), the flow branches to step 925 in order to have a try to allocate to GT next to CGT.

On the other hand, in the case where there is a PT list in CGT (that is, there is a resource allocation request from a process which belongs to the process group of CGT), it is possible to allocate the resource to a leading PT of the PT list unconditionally. In this case, therefore, the leading PT is changed to a resource allocated condition and the process of the leading PT is changed from an execution waiting condition to an execution enabled condition (step 918). Next, the resource allocation request type of the leading PT is judged (step 919). If the request type is "EXC", it is not possible to allocate the resource to the succeeding PT and hence the flow branches to step 925 in order to have a try to allocate the resource to the next process group.

On the other hand, if the resource allocation request type of the leading PT is "SHR", there is a possibility that the resource can be allocated to the succeeding PT. In this case, therefore, a PT next to the leading PT is set as a current PT (CPT) (step 920). And, the judgement is made as to whether or not there is CPT to which the resource is to be allocated (step 921). In the case where there is no CPT, the flow branches from step 921 to step 925. On the other hand, in the case where there is CPT to which the resource is to be allocated, the resource allocation request type of CPT is judged (step 922).

If the resource allocation request type of CPT is "EXC", it is not possible to allocate the resource to another PT concurrently with CPT and hence the flow branches to step 925. On the other hand, if the resource allocation request type of CPT is "SHR", CPT is turned into a resource allocated condition (or "HOLD" is set into PTALLOC 74) and a process corresponding to CPT is changed from an execution waiting condition to an execution enabled condition (step 923). In order to have a try to allocate a PT next to CPT, the PT next to CPT is newly set as CPT (step 924) and the flow returns to step 921. Namely, the allocation of the resource is continued until PT's having the request type of "SHR" is discontinued.

In step 925, the resource allocation request type of CGT is judged. If the resource allocation request type of CGT is "EXC", it is not possible to allocate another GT concurrently with CGT and hence the processing is completed. On the other hand, if the resource allocation request type of CGT is "SHR", there is a possibility that the resource can be allocated to a GT next to CGT and hence the GT next to CGT is newly defined as CGT (step 926). And, the judgement is made as to whether or not there is the corresponding CGT (step 927). In the case where there is not the corresponding CGT, no allocation of the resource is required and hence the processing is completed.

On the other hand, in the case where there is the corresponding CGT, the resource allocation request type of CGT is judged in order to examine whether or not the resource can be allocated to CGT (step 928). If the resource allocation request type of CGT is "EXC", the processing is completed since it is not possible to share the resource with another GT. On the other hand, if the resource allocation request type or CGT is "SHR", it is possible to allocate the resource to CGT concurrently with another GT. In this case, therefore, the flow branches to step 916 to repeat the processing for allocation of the resource to CGT and the PT list of CGT.

Figure 11:
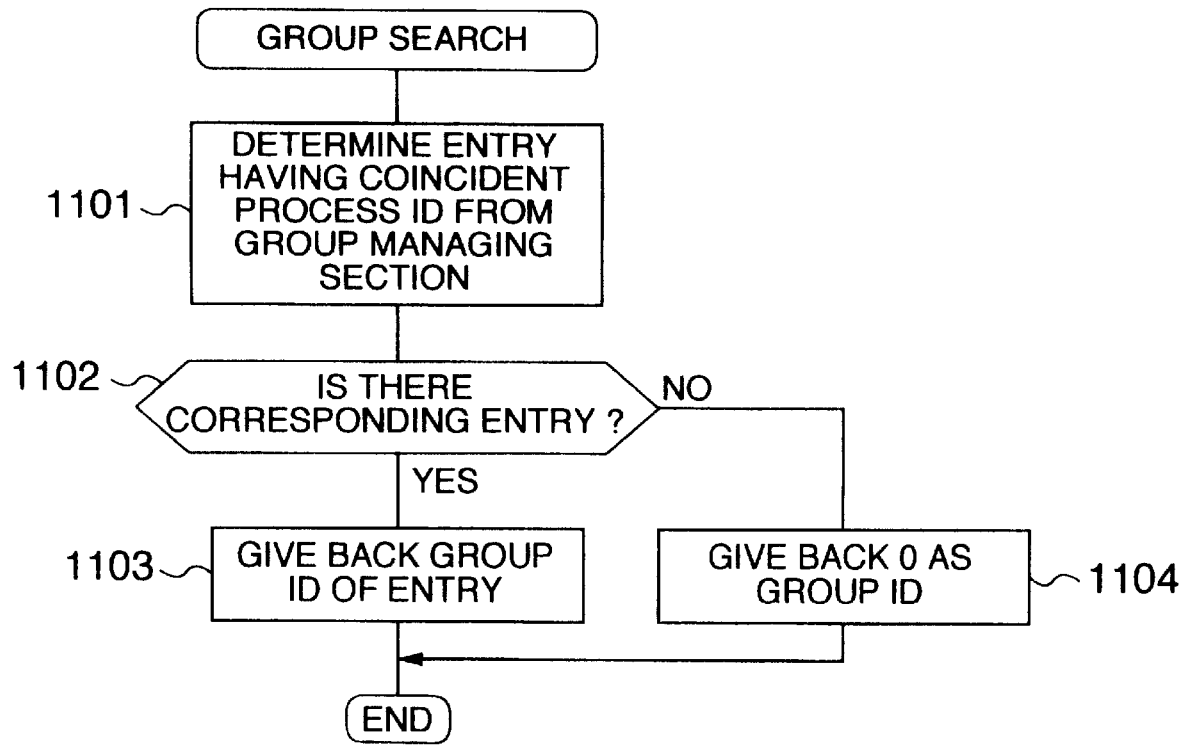
FIG. 11 is a flow chart showing a group search processing.

FIG. 11 shows the flow of a processing for determining the group ID of a process group to which a process belongs. In the present embodiment, the group ID of a process having no group registration declaration is 0, as mentioned above. Therefore, the group ID of a process group to which a process belongs is determined as follows. First, an entry is determined in which the process ID of the process and GRPPID 41 of the group managing section 40 coincide with each other (step 1101). If there is the corresponding entry (step 1102), a group ID of GRPGID 42 of the determined entry is given back (step 1103). On the other hand, if there is not the corresponding entry, 0 is given back as a group ID (step 1104).

Figure 12:
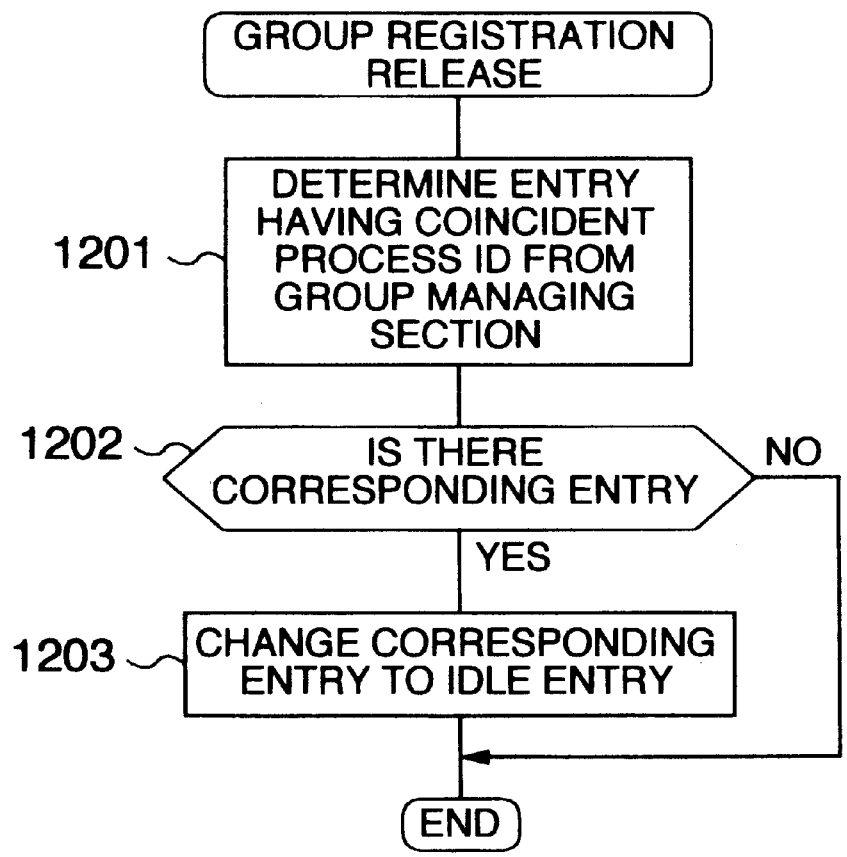
FIG. 12 is a flow chart showing a group registration release declaration processing.

FIG. 12 shows the flow of a processing for group registration release. In the group registration release processing, an entry is determined in which the process ID of a process and GRPPID 41 of the group managing section 40 coincide with each other (step 1201). And, the judgement is made as to whether or not there is the corresponding entry (step 1202). If there is not the corresponding entry, the processing is completed. On the other hand, if there is the corresponding entry, the entry determined in step 1201 is changed to an idle entry (step 1203).

Figure 13:
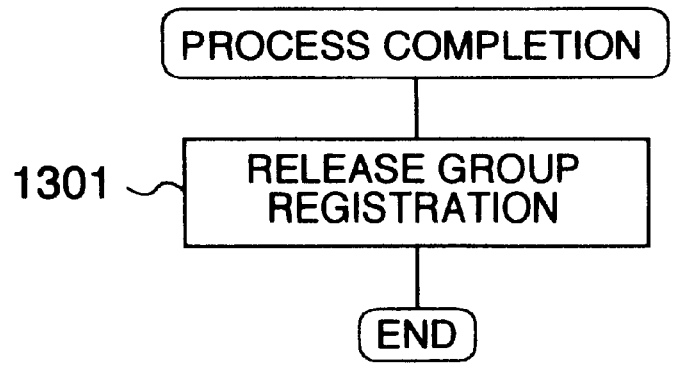
FIG. 13 is a flow chart showing a process completion declaration processing.

FIG. 13 shows the flow of a processing when a process is completed. When a process is completed, the group registration release processing shown in FIG. 12 is called and that entry of the group managing section 40 which became unnecessary by the completion of the process is given back as an idle area (step 1301).

According to the present embodiment, it is possible to prevent the "sunk" state or "hungered" state of a process group. Also, a resource waiting process does not make the wasteful use of the processing time of a CPU. Further, it is possible to prevent the "sunk" state or "hungered" state of a process. Still further, it is possible to allocate a resource to a plurality of process groups concurrently in accordance with situations. Furthermore, it is possible to select the concurrent allocation of a resource to a plurality of processes or the limited allocation of a resource to one process in accordance with situations.

We claim:

1. A resource allocation method in a computer system in which a resource is allocated to at least one of a plurality of process groups inclusive of one or more processes on a process group basis or to at least one of a plurality of processes included in a process group on a process basis, comprising:

making, in response to a request for the allocation of a resource issued from a process in one of the plurality of process groups, the judgement as to whether or not the allocation of said resource to the one process group is possible, the judgement being made on the basis of allocating conditions of said resource to another process group;

storing, in response to a result that the judgement shows the allocation of said resource to the requesting process group is not possible, an order of requests from process groups including the requesting process group for the allocation of said resource; and allocating said resource to the requesting process groups successively in accordance with the order thus stored.

2. A resource allocation method in a computer system according to claim 1, wherein at the time of request for the allocation of a resource from a process, the requesting process is caused to designate whether or not said resource can be shared with another process which belongs to the same process group;

in response to a request which a process makes for the allocation of a resource being allocated to another process belonging to the same process group, the judgement is made as to whether or not the sharing of said resource is designated by the requesting process and the other process;

in response to the affirmative result of judgement, said resource is allocated to said requesting process; and in response to the negative result of judgement, the allocation of said resource to said requesting process is postponed.

3. A resource allocation method in a computer system according to claim 1, wherein in response to the negative result of judgement, the process making the request for the allocation of said resource is turned into an execution waiting condition; and when the allocation of said resource becomes possible, said process in the execution waiting condition is turned into an execution enabled condition.

4. A resource allocation method in a computer system according to claim 3, wherein in response to the turn of said process into the execution waiting condition, the sequence of requests from processes for the allocation of said resource is stored; and said resource is allocated to the requesting processes successively in accordance with the stored sequence.

5. A resource allocation method in a computer system in which a resource is allocated to at least one of a plurality of process groups including one or more processes on a process group basis, comprising:

causing, at the time of a request for the allocation of a resource issued from one of the plurality of process groups, the requesting process group to designate either that said resource can be shared with another process group or some other use of said resource;

making, in response to a request issued from one of process groups for the allocation of a resource which is being allocated to another process group, the judgement as to whether or not the sharing of said resource is designated by both the requesting process group and the other process group;

causing, in response to a result that the judgement shows the sharing of said resource, said requesting process group to share said resource with said other process group; and postponing, in response to a result that the judgement does not show the sharing of said resource, the allocation of said resource to said requesting process group until said resource is released.

6. A resource allocation method in a computer system in which a plurality of process groups each including one or more processes are provided and a resource is allocated to at least one process included in a process group on a process basis, comprising:

making, in response to a request for the allocation of a resource issued from a process in one of the plurality of process groups, the judgement as to whether or not the allocation of said resource to the requesting process is possible, the judgement being made on the basis of allocating conditions of said resource to another process which belongs to the same process group;

turning, in response to a result that the judgement shows the allocation of said resource to the requesting process is possible, said requesting process into an execution waiting condition; and turning, when the allocation of said resource to the requesting process becomes possible, said requesting process in the execution waiting condition into an execution enabled condition.

7. A computer system comprising:

at least one resource;

a plurality of process groups each of which has a plurality of processes;

an exclusive control managing section for storing:

first information including:

an order of requests for allocation of each resource made by process groups, either a sharing use type or an exclusive use type of a resource allocation request issued from each of said process groups, and a condition of allocation of each resource on a process group basis, and second information including:

an order of requests for allocation of each resource made by processes, either a sharing use type or an exclusive use type of a resource allocation request issued from each of said processes, and a condition of allocation of each resource on a process basis; and a process execution managing section for making exclusive allocation of a resource among processes in a process group allocated with said resource, the control being made on the basis of said first and second information stored in said exclusive control managing section.

8. A computer system according to claim 7, wherein on the basis of the first and second information stored in said exclusive control managing section, said process execution managing section allocates a resource to processes in a process group allocated with said resource which processes continuously make requests for shared allocation of said resource.

9. A computer system according to claim 7, wherein on the basis of the first and second information stored in said exclusive control managing section, said process execution managing section allocates a resource to process groups which continuously make requests for shared allocation of said resource.

10. A computer system according to claim 9, wherein on the basis of the first and second information stored in said exclusive control managing section, said process execution managing section makes a control for shared allocation of a resource among processes which belong to discrete process groups subjected to shared allocation of said resource.

* * * * *